(12) United States Patent
Baldwin (10) Patent No.: US 8,350,187 B2
(45) Date of Patent: Jan. 8, 2013

(54) METHOD AND APPARATUS FOR LASER MACHINING

(75) Inventor: Leo Baldwin, Livermore, CA (US)

(73) Assignee: Electro Scientific Industries, Inc., Portland, OR (US)

( * ) Notice: Subject to any disclaimer, the term of this patent is extended or adjusted under 35 U.S.C. 154(b) by 595 days.

(21) Appl. No.: 12/413,531

(22) Filed: Mar. 28, 2009

(65) Prior Publication Data

US 2010/0243626 A1 Sep. 30, 2010

(51) Int. Cl.
*B23K 26/00* (2006.01)
(52) U.S. Cl. .......... 219/121.72; 219/121.67; 219/121.74
(58) Field of Classification Search .............. 219/121.72, 219/121.67, 121.73, 121.74
See application file for complete search history.

(56) References Cited

U.S. PATENT DOCUMENTS

| | | | |
|---|---|---|---|
| 4,417,393 A | 11/1983 | Becker | |
| 4,487,993 A | 12/1984 | Becker | |
| 4,710,253 A | 12/1987 | Soszek | |
| 5,576,073 A | 11/1996 | Kickelhain | |
| 5,798,927 A | 8/1998 | Cutler et al. | |
| 5,925,271 A * | 7/1999 | Pollack et al. | 219/121.74 |
| 6,143,356 A | 11/2000 | Jablonski | |
| 6,163,957 A | 12/2000 | Jiang et al. | |
| 6,222,156 B1 | 4/2001 | Datta | |
| 6,433,301 B1 | 8/2002 | Dunsky et al. | |
| 6,635,848 B2 * | 10/2003 | Hauer et al. | 219/121.72 |
| 6,777,645 B2 * | 8/2004 | Ehrmann et al. | 219/121.73 |
| 6,811,069 B2 * | 11/2004 | Hauer et al. | 225/93.5 |
| 6,909,735 B2 | 6/2005 | Lizotte et al. | |
| 6,989,508 B2 * | 1/2006 | Ehrmann et al. | 219/121.73 |
| 7,014,082 B2 * | 3/2006 | Hauer et al. | 225/93.5 |
| 7,014,727 B2 | 3/2006 | Wargo et al. | |
| 7,148,447 B2 * | 12/2006 | Ehrmann et al. | 219/121.73 |
| 7,164,099 B2 | 1/2007 | Hata et al. | |
| 7,511,247 B2 * | 3/2009 | Li | 219/121.61 |
| 2002/0158052 A1 * | 10/2002 | Ehrmann et al. | 219/121.69 |
| 2006/0207975 A1 * | 9/2006 | Ehrmann et al. | 219/121.68 |
| 2007/0075058 A1 * | 4/2007 | Ehrmann et al. | 219/121.69 |

FOREIGN PATENT DOCUMENTS

| | | |
|---|---|---|
| JP | 05-261578 A | 10/1993 |
| JP | 10-263872 A | 10/1998 |
| WO | WO 2007-044798 A2 | 4/2007 |

OTHER PUBLICATIONS

International Preliminary Report on Patenttability of PCT/US2010/028884.
International Search Report of PCT/US2010/028884.

\* cited by examiner

Primary Examiner — M. Alexandra Elve (57) ABSTRACT

A method and apparatus is presented for laser machining complex features in workpieces using programmable laser focal spot shapes. A deformable mirror is inserted into the laser beam path of a laser machining system and programmed to alter the shape of the laser beam focal spot in real time as the workpiece is being laser machined in order to achieve improved control over the shape and size of laser machined features.

8 Claims, 9 Drawing Sheets

Fig. 9 ated by Tadeusz Pustelny et. al., Proceedings of the SPIE Vol. 5956

METHOD AND APPARATUS FOR LASER MACHINING

TECHNICAL FIELD

This invention relates to methods and apparatus for laser machining workpieces. In particular it relates to laser machining trenches or guides in the surface of electronic substrates which can be subsequently processed in order to form conductors or waveguides. In more particular it relates to laser machining trenches or guides in the surface of electronic substrates with consistent cross-sections in order to control the electrical and optical properties of the subsequently formed conductors or waveguides.

BACKGROUND OF THE INVENTION

Directed and focused laser energy is used for a variety of manufacturing tasks requiring precision material removal such as drilling of blind and through vias in electronic circuit substrates, repair or modification of semiconductor circuits, dicing or scribing of circuit assemblies for singulation, or other complex tasks involving drilling, cutting machining, or exposure of photosensitive materials. Materials process range from organic circuit substrate materials such as FR-4 or ABT, semiconductor wafers of silicon or sapphire, metals or metal foils or various types of plastic or glass. What these applications have in common is that the machining is accomplished by focusing a laser beam or laser pulses into a small focal spot proximate to the workpiece, thereby concentrating the laser energy into a focal spot which is imaged onto or near the surface of a workpiece in order to vaporize, ablate or otherwise cause the removal of material.

This type of laser focal spot machining is particularly useful in the manufacture of electronic substrates. The manufacturers of electrical and electro-optic assemblies continue to strive for higher density, faster circuitry and greater integration of components in order to deliver greater value to the consumer. As part of this striving, manufacturers are seeking to improve methods of interconnecting devices on substrates including electrical and electro-optic devices. Components are typically interconnected by attaching them to possibly multilayer substrates that have had circuit patterns applied to the surfaces of the substrates using additive or subtractive etching along with photosensitive resist applications.

Problems exist with this method of interconnecting electronic or electro-optic devices on a substrate. The first is that as circuit switching speeds increase, the electrical properties of the conductors on the substrate become a significant factor in limiting the speed at which the circuits can be clocked. Forming planar conductors on the surface of a substrate can exacerbate this problem. As currents and switching speeds increase, the shape of the cross-section of the conductor can become a significant factor in the electrical performance of the circuit in it occurs. In particular, changes in the cross-sectional shape of the conductor can cause unwanted changes in the conductor's impedance, which can cause reflections and signal loss. In addition, the density with which circuits can be applied to the substrate is partially a function of the size of conductors on the surface of the substrate.

For optical waveguides the cross-sectional topology of the channel or trench forming the waveguide is critical. In some cases, in addition to acting as a waveguide, parts of the channel can be used as optical elements such as mirrors. In this case the topology and the surface texture are critical elements of the channel feature in addition to the topology of the waveguide itself.

A prior art method of forming circuits interconnects on a substrate by laser machining trenches or channels in the surface of the substrate, sometimes referred to a laser direct ablation or LDA is given in U.S. Pat. No. 7,014,727 METHOD OF FORMING HIGH RESOLUTION ELECTRONIC CIRCUITS ON A SUBSTRATE, Christopher Wargo, et. al., inventors, describing a method of forming conductors on organic-based substrates such as FR-4. The method described uses a laser to machine channels in a layer of resist material applied to the surface of a substrate. The method also describes machining this channel into the substrate. These channels are subsequently filled with conducting material to form conductors. This patent discloses the need to form the channels in the substrate with appropriate size, shape and depth but does not disclose or discuss any particular way to achieve this. In particular this reference does not discuss maintaining the size and shape of channels as the path is changed in direction and shape.

In addition, channels in an electronic circuit substrate can also be used as optical waveguides. A description of optical waveguides is found in "Laser Ablation and Laser Direct Writing as Enabling Technologies for the Definition of Micro-Optical Elements", by Nina Hendrickx, et. al., published in Integrated Optics: Theory and Applications, edited by Tadeusz Pustelny et. al., Proceedings of the SPIE Vol. 5956 pp 5961B-1-5961B-10. In this article, the authors describe using a laser to machine waveguides in substrates in order to integrate electro-optic components such as laser diodes with electronic components more closely. The article discusses the need to form waveguides with surface textures appropriate to optical devices and how it can be achieved, but does not discuss in detail how the shape and size of the waveguide can be controlled while laser machining.

A problem with laser machining channels to form conductors or waveguides in electronic substrates is that in general, these channels have to change direction on the surface of the substrate in order to connect desired points. This requires that the laser machine shapes such as curves in the surface of the substrate. Machining curves in the surface using prior art laser spots will cause the channel to vary in depth as it is machined. For example Gaussian profile beam will, on translation, leave a super-Gaussian profiled groove. A round-flat profile (Top Hat profile) beam will leave a cosine-shaped groove and a square-flat profile will leave a flat square groove. Current state of the art is to use a flat-square profile for operations like scribing or dicing where a uniform dose of laser irradiation is desired to leave a uniform straight-line cut with minimal edge effects. This is typically accomplished with refractive, diffractive, or holographic beam shapers that are placed in the beam path to transform by redistribution of energy an incident beam that is typically substantially Gaussian into one that is substantially uniform (round or square outline with substantially uniform intensity within).

Figure 1:
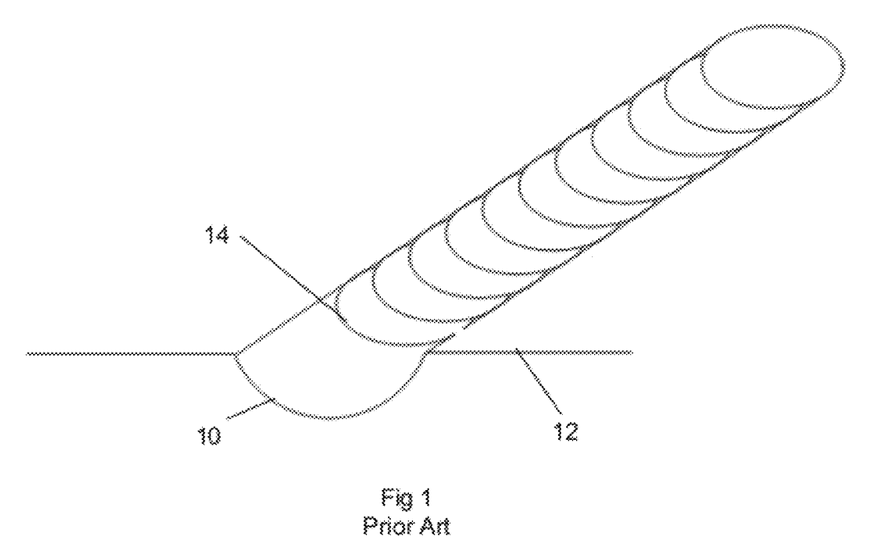
FIG. 1 is a diagram showing prior art laser machining with circular-flat laser pulses.

This effect is illustrated in FIG. 1, which is a schematic diagram of a channel laser machined with a top hat profile beam. In FIG. 1, a channel 10 is laser machined into a substrate 12 with a pulsed laser beam (not shown) with a top hat or "round-flat" profile. The overlapped circles 14 represent positions of the laser pulses. When laser machining channels with a pulsed laser, typically the laser is indexed or moved smoothly and continuously along the path of the channel to be machined as the laser is pulsed, thereby machining a smooth and continuous feature in the substrate. The actual number of positions will vary depending upon the size of the laser spot, the desired width of the channel and the energy per pulse delivered to the substrate, and hence the amount of material removed per pulse. The number of pulse positions shown is much reduced from actual practice to show the positions more clearly. The amount of material removed is calculated from the cumulative dose received at each point in the channel from the multiple pulses each point receives as the pulsed beam is translated down the predetermined path that the channel will follow. All these examples would apply equally well if the laser were continuous wave (CW) rather than pulsed.

Figure 2:
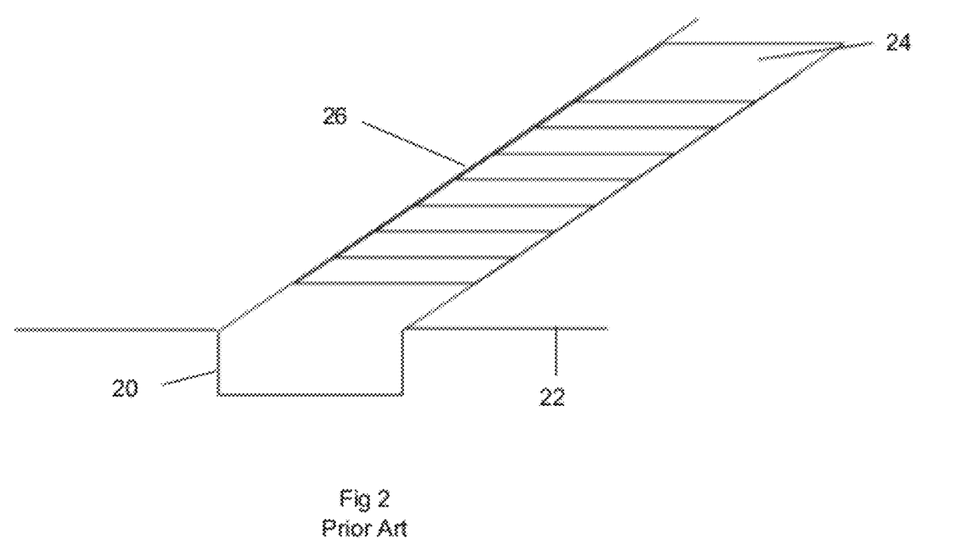
FIG. 2 is a diagram showing prior art laser machining with square-flat laser pulses.

FIG. 2 shows a diagram of a rectangular cross section channel 20 laser machined in a substrate 22 by a laser beam with a square flat focal spot, one of which is shown 24. The over lapping squares, 26, represent successive positions of the laser focal spot as the channel 20 is machined. As in FIG. 1, the number of overlapping laser focal spot positions shown is schematic and may vary in actual practice depending upon laser repetition rate, laser pulse energy, pulse size, and other laser parameters. Note that since the laser energy is distributed evenly over a square focal spot, the calculated cumulative dose received by each point in the channel is equal as the laser spot moves along the desired machining path, causing the resulting channel to have a flat bottom with square edges. This is quite often desirable in LDA applications. Note that this analysis works with both pulsed and CW lasers.

Figure 3:
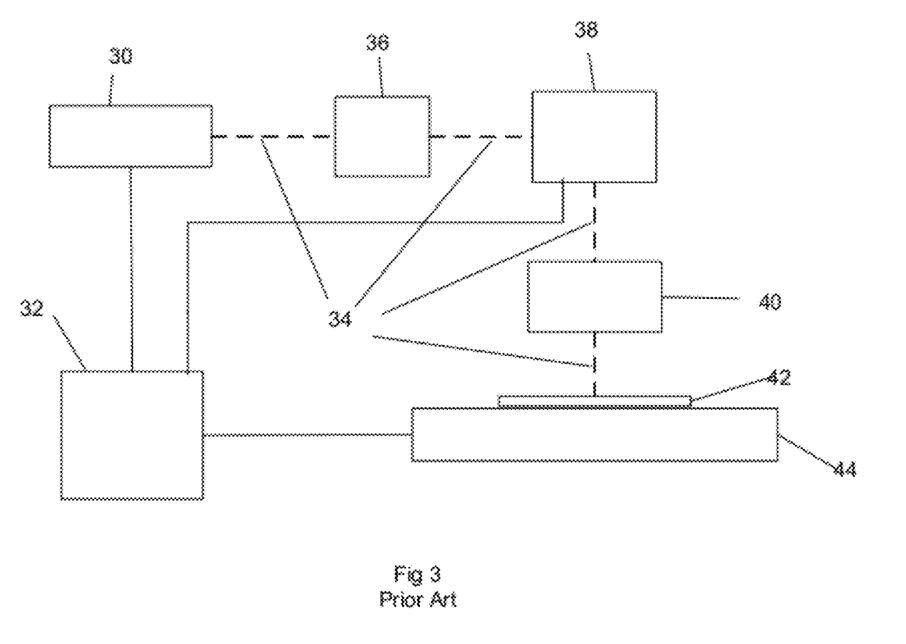
FIG. 3 is a diagram of a prior art laser machining system.

Laser machining systems designed to machine certain features in electronic substrates, for example vias in multilayer electronic substrates have been described in the prior art. U.S. Pat. No. 5,798,927, APPARATUS AND METHOD FOR COORDINATING THE MOVEMENTS OF STAGES IN MULTI-STAGE MULTI-RATE POSITIONER SYSTEM, inventors Cutler, et. al. assigned to the assignee of the instant invention describes combining beam steering devices with high and low positioning rates and accuracies to quickly and accurately position a laser beam on a workpiece. U.S. Pat. No. 6,433,301 BEAM SHAPING AND PROJECTION IMAGING WITH SOLID STATE UV GAUSSIAN BEAM TO FORM VIAS, inventors Dunsky, et. al. describes using diffractive optical elements to form desired beam shapes for via drilling applications. FIG. 3 shows a diagram of a prior art laser machining system designed to machine vias in multilayer electronic substrates. A laser 30, which may be a pulsed, solid state UV laser emits, at the direction of the controller 32, laser pulses 34 which are shaped by the beam shaping optics 36 which may be holographic or diffractive, which are then steered by the beam steering optics 38, which may be multistage, at the direction of controller 32, to the scan optics 40 which may be an f-theta lens, onto the workpiece 42 which may be a multilayer electronic substrate, which is fixtured on a motion control unit 44 which moves the workpiece 42 in relation to the laser pulses 34 at the direction of the controller 32 and in cooperation with the beam steering optics 36 to cause the laser pulses 34 to machine the desired feature in the workpiece 42. Exemplary systems employing these elements to machine features in electronic substrates are the Si5330 and the ICP5650 laser processing systems, manufactured by Electro Scientific Industries, Portland, Oreg., and the assignee of the instant invention.

Figure 4:
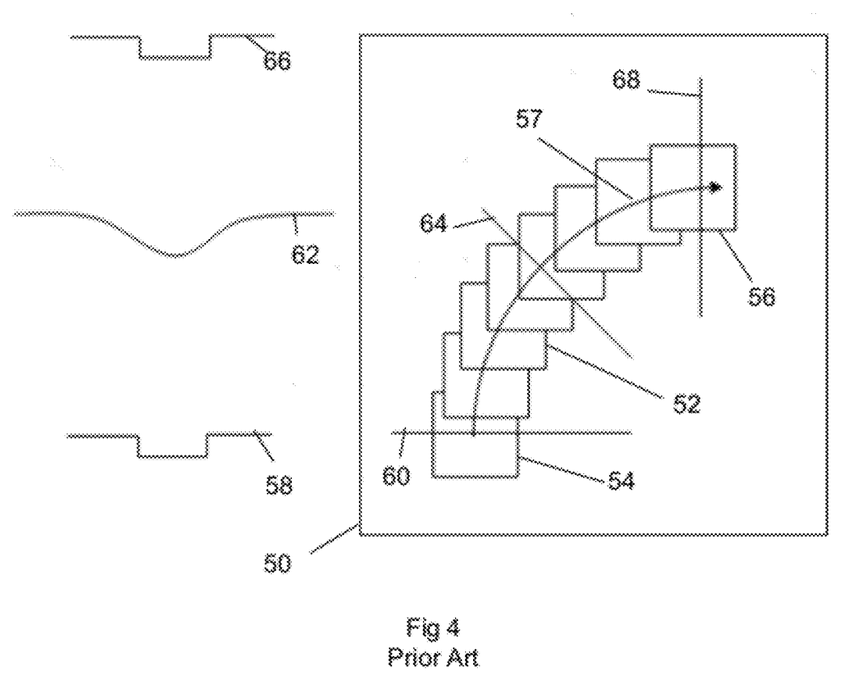
FIG. 4 is a diagram of a curved feature machining in a substrate by a prior art system.

FIG. 4 is a simulation of the result of using a prior art laser machining system as described in FIG. 3 to machine a curved channel in a substrate 50. A laser processing system (not shown) directs a series of square-flat laser pulses 52 onto a substrate 50 starting at pulse 54 and ending at pulse 56, following path 57. The cross sections 58, 62 and 66 of the resulting channel, taken along lines 60, 64 and 68, respectively, correspond to the cumulative laser radiation dose along lines 60, 64 and 68, respectively. Note that while cross sections 58 and 66 are acceptable, as the laser pulses 52 travel along path 57 the shape of the machined channel begins to deviate from the square-sided, flat-bottomed cross section 58 until it becomes as in cross section 62, then gradually changing back to cross section 66. This is an undesirable result. It is evident from these results that the prior art system does not achieve the desired topology of the machined channel by not properly controlling the cumulative laser radiation dose at each point in the feature as machining takes place.

What is needed then is a method and apparatus for achieving laser machined channels with a desired consistent size and depth in electronic substrates as the channel path changes direction and shape.

SUMMARY OF THE INVENTION

One goal of the instant invention is to describe a method and apparatus for laser machining features in electronic substrates with consistent size, depth and shape despite changes in feature path direction and shape. Another goal of the instant invention is to describe a method and apparatus for laser machining features with consistent size, depth and shape despite changes in feature path direction and shape by changing the shape of the focal spot in real time as the feature is being laser machined.

Figure 5:
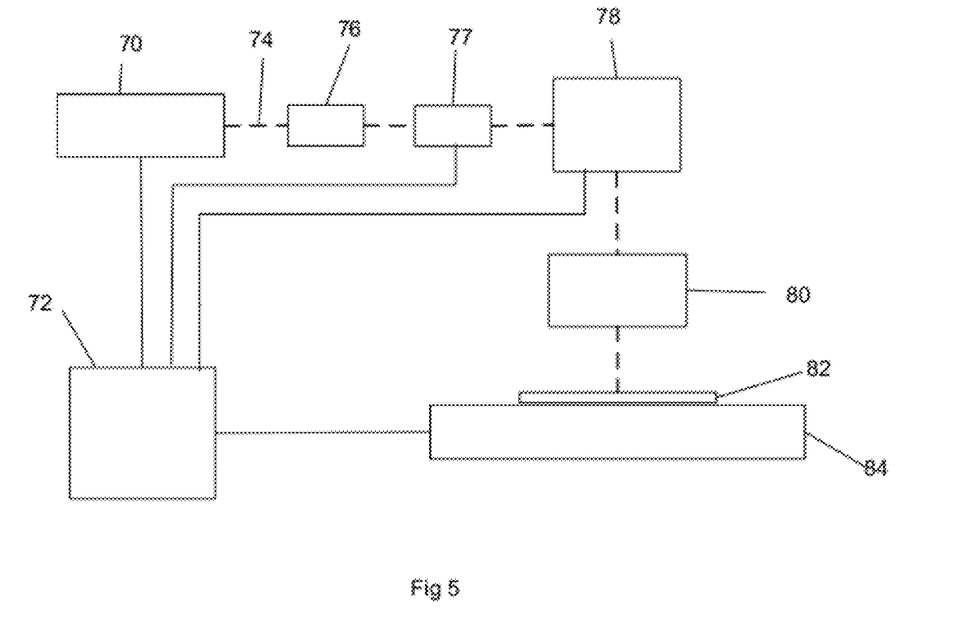
FIG. 5 is a diagram of a laser machining system constructed according to an embodiment of the instant invention.

FIG. 5 shows an embodiment of the instant invention that changes the shape of the laser pulse focal spot on the fly as the laser pulses machine a workpiece and thereby overcome the above-described short comings of the prior art. Desired laser focal spot shapes are calculated based on the shape of features being machined. Given a particular shape to be machined, a shape is chosen which, when translated and rotated through the desired feature envelope, leaves the sides and bottom of the feature in a desired smoothness and shape and maintains a desired cross-section when laser machined with the appropriate laser pulse parameters and relative motion parameters between the laser pulses and the workpiece.

Figure 6:
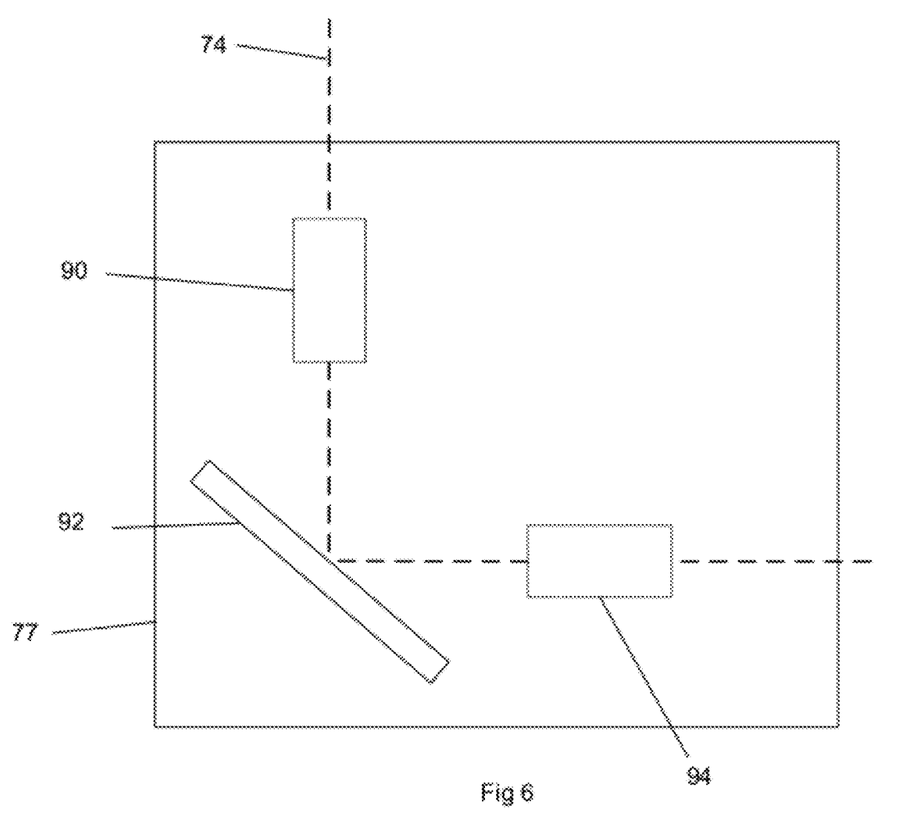
FIG. 6 is a diagram of a programmable beam shaper constructed according to an embodiment of the instant invention.

FIG. 6 shows a more detailed view of a programmable beam shaping optics assembly. This embodiment inserts a programmable deformable mirror into the optical path of a laser machining system to allow the system to programmably alter the focal spot shape and energy distribution of the laser pulses in real time as the system machines channels in a workpiece. The embodiment works by receiving the laser pulses, optionally expanding the beam out and projecting them onto the surface of a deformable mirror. The deformable mirror is composed of an array of actuators attached to a flexible mirror. The mirror can either be segmented to allow the actuators to move the section of mirror attached to it individually or continuous, where the actuator can move the surface of a deformable mirror up and down even though it is a continuous surface. We chose the continuous model for this embodiment. By moving the surface of the mirror the mirror shapes the laser pulse by introducing phase shifts that alter the shape of the pulse much like a hologram. The laser light striking the surface of the mirror is collimated to have a planar wavefront as it reaches the mirror. The variations introduced into the surface of the deformable mirror introduce phase shifts into the wavefront that, when focused into a spot, yield particular distributions of laser energy directly related to the perturbations introduced by the deformable mirror. The light reflecting off the mirror is directed either to beam steering optics and then a scan lens to focus the spot down to a working size spot. Optionally the light reflected from the mirror is sent though optional output optics in the case where the deformable mirror is at a distance from the beam steering and scan optics and a relay lens is required to maintain beam quality. The deformable mirror is programmed to reflect the desired shape of the laser pulse signal to the scan lens via beam steering optics and optional relay optics, thereby creating the desired shape of the laser pulse focal spot within the resolution of the mirror.

Since the deformable mirror is altering the laser pulse wavefront, it is possible to create any shape with any grayscale density possible within the resolution of the mirror. This means that the system can be programmed to reflect a "grayscale" mask, where the amount of laser light projected onto the substrate can take values between 0 and 100% of the input light at any point in the laser focal spot. In this way the cumulative dose of laser radiation that an individual point in the feature receives can be accurately programmed, making complex feature shapes possible. This also allows the resulting focal spot to be rotated, since rotating the pattern programmed into the deformable mirror will rotate the resulting focal spot shape.

This embodiment uses the fact that the deformable mirror is programmable and can be completely reconfigured in a little as 100 microseconds to shape the laser pulses in a completely different shape. This allows the deformable mirror to change the laser pulse focal spot shape on the fly as the feature is being machined. Calculations are made to determine how many different shapes would be required to machine a feature with the desired allowable deviations from the nominal shape and at which points the shapes should change. The system then calculates the laser parameters required to machine the feature, including number of pulses, laser repetition rate, pulse duration and pulse energy and then coordinates the pulsing of the laser with the updating of the deformable mirror and the beam steering optics to laser machine the feature.

In operation, a feature such as a path segment for a channel to be laser machined, is examined to determine what laser focal spot shape or shapes will be used to machine the feature. The information can come from CAD data associated with the substrate and subsequently analyzed to extract known path segments to match up with predetermined shapes. Once the sequence of shapes is selected, the laser pulse parameters and the motion control parameters are selected to machine the feature with the desired size, shape and surface smoothness.

The laser system then instructs the motion control subsystem and the laser pulse steering optics to move the substrate into position relative to the laser pulse axis and begins pulsing the laser. The deformable minor causes the laser pulse focal spot to assume the desired shape as the motion control subsystem and the laser pulse steering optics combine to change the substrate position relative to the laser pulses. While the laser is pulsing and the substrate moves in relation to the pulses, the deformable mirror updates the shape of the laser focal spot and thereby causes the laser pulses to machine the feature with the desired consistent topology and surface finish, thereby overcoming the previously stated shortcomings of the prior art.

DESCRIPTION OF THE PREFERRED EMBODIMENTS

As will be described in the following discussions, embodiments of the instant invention solve the problems indicated in the prior art by shaping the laser pulse focal spot to control the distribution of energy delivered by the laser pulse to the workpiece. FIG. 5 shows an embodiment of the instant invention, with a laser 70, which may be a pulsed, solid state UV laser, emits, at the direction of a controller 72, laser pulses 74 which are shaped by the collimating optics 76 which creates a larger, collimated pulse from the pulses emitted from the laser 70. The collimating optics 76 collimates the laser pulses and expands them into the desired beam size. The laser pulses 74 have an effective diameter of a few millimeters at this point. The laser pulses 74 are then passed to the focal spot shaping optics 77 which shape the laser pulse focal spot into a desired shape at the direction of controller 72. The pulses are then directed to the pulse steering optics 78, which may be multi-stage and also controlled by the controller 72, then on to the scan optics 80 which may be an f-theta lens, which focuses and directs the laser pulses 74 onto the workpiece 82 which may be an electronic substrate, which is fixured on a motion control assembly 84 which moves the workpiece 82 in relation to the laser pulses 74 at the direction of the controller 72 and in cooperation with the beam steering optics 78 to cause the laser pulses 74 to be directed at a desired point on the workpiece 82, thereby machining the desired feature in the workpiece 82.

FIG. 6 shows details of the focal spot shaping optics 77. The laser pulses 74 are received by the optional input optics 90 where the collimated pulses are magnified if necessary and projected onto the surface of the deformable mirror 92 which has a clear aperture of about 9.6 mm. The deformable mirror, under control of the controller (not shown) modulates and shapes the laser pulses 74 before reflecting them to the optional output optics 94, which relays the laser pulses onto the pulse steering optics 78. The output optics 94 are used to relay the output of the deformable mirror 92 in cases where the mirror 92 and the pulse steering optics 78 are separated by more than a few centimeters. The deformable mirror 92 is constructed by attaching each actuator in an array of actuators to the back of a single flexible mirror. As the actuators move up and down they deform the surface of the mirror. The resolution of the actuators is such that deformable mirrors of this type can interact with the laser pulse by creating a programmable shift in the laser beam wavefront, thereby creating hologram-like interference patterns in the laser pulse, where the constructive and destructive interference of the waves shape the laser focal spot. One possible way to program the mirror is to calculate a series of coefficients proportional to the real, positive portion of the Fourier transform of the focal spot shape desired and use them to program the mirror.

An exemplary deformable mirror assembly is the Kilo-DM, manufactured by Boston Micromachines Corporation, Cambridge, Mass. This device comprises a 32×32 array of mirror elements with up to 1.5 micron stroke per mirror element, with up to a 9.6 mm clear aperture. This device can update the entire array at a frame rate of up to 10 kHz, meaning that the laser pulse focal spot can change completely in 100 microseconds.

Figure 7:
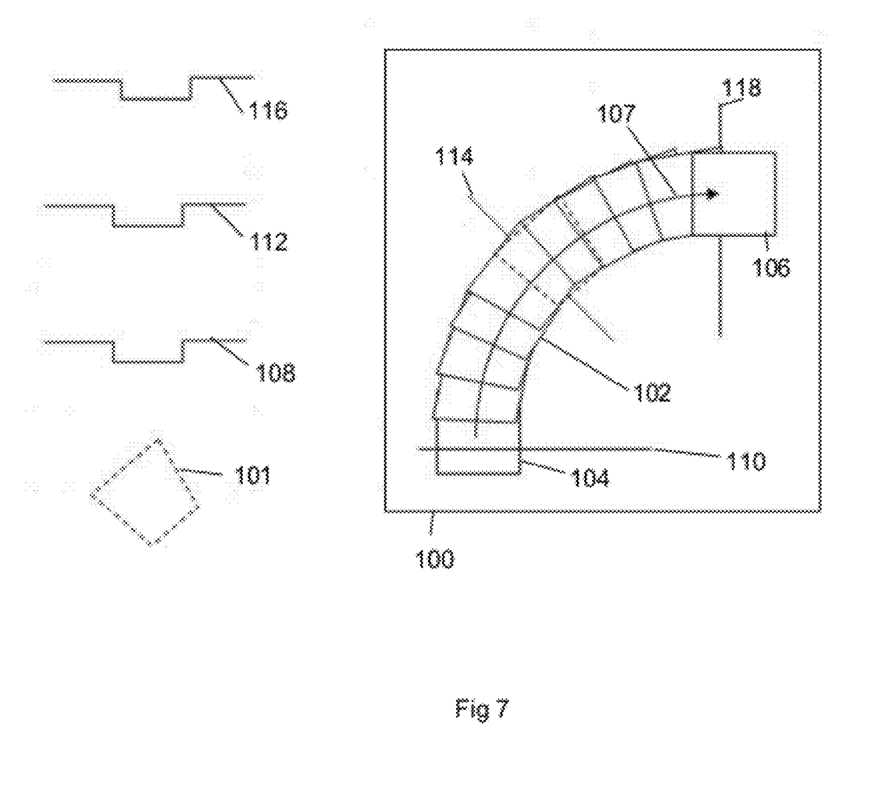
FIG. 7 is a diagram of a curved feature laser machined by an embodiment of the instant invention.

FIG. 7 is a simulation of the result of using an embodiment of the instant invention as described in FIG. 5 to machine a curved channel in a substrate 100. The laser processing system (not shown) directs a series of shaped laser pulses which have a basic laser pulse focal shape 101 to the substrate 100, rotating the basic shape as required to match the curve of the channel. The pulses 102 are directed onto the substrate 100 starting at pulse 104 and ending at pulse 106, following path 107. The cross sections 108, 112 and 116 of the resulting channel, taken along lines 110, 114 and 118, respectively, correspond to the cumulative laser radiation dose along lines 110, 114 and 118, respectively. Note that all cross sections 108, 112 and 116 are acceptable, meaning that the resulting channel will have a square-sided, flat-bottomed cross section through its entire length, a desired result.

Figure 8:
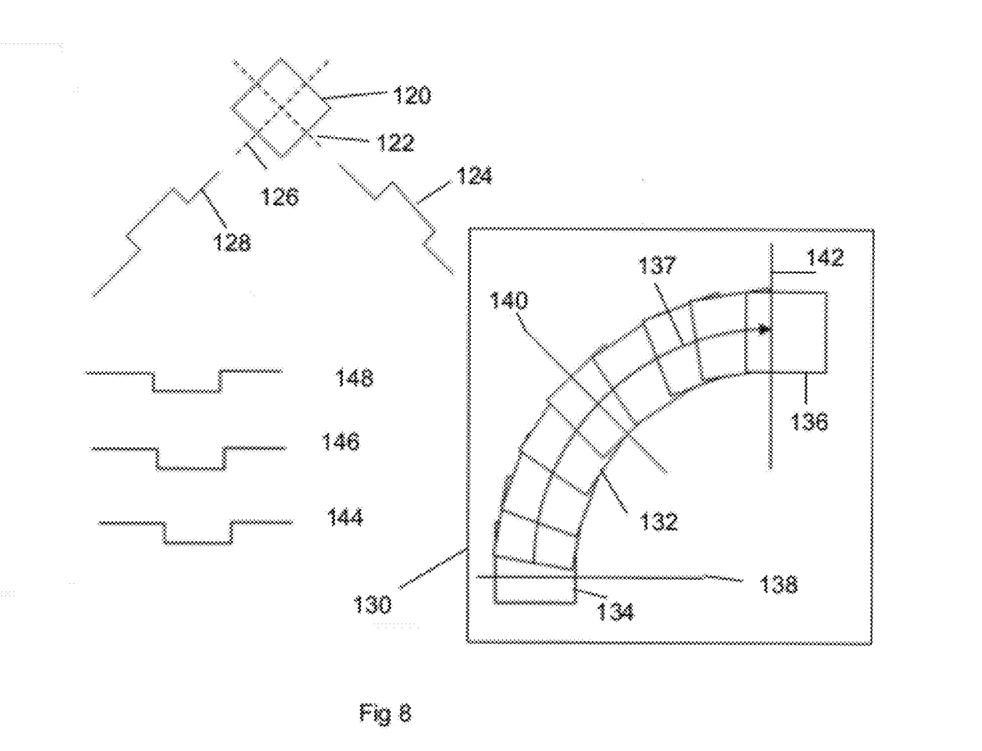
FIG. 8 is a diagram of a curved feature laser machined by an embodiment of the instant invention.

FIG. 8 is a simulation of another embodiment of the instant invention. The laser processing system (not shown) directs a series of shaped laser pulses which have the basic laser focal spot shape 120. Note that this focal spot shape has been programmed to have tailored distribution of intensities across the focal spot. Cross section line 122 on laser focal spot shape 120 has the intensity distribution, and hence laser radiation dose 124. The intensity distribution is the same for all cross sections parallel with line 122. Cross section line 126, taken at right angles to cross section 122, shows an even distribution of intensity 128 across the focal spot shape. This tailored distribution of laser energy permits this shape to machine a feature with rectangular cross section. This embodiment achieves this by calculating the cumulative dose as the selected focal spot shape is rotated and translated along a path and contouring the energy distribution within in the focal spot shape so that the cumulative energy dose at each point is equal. FIG. 8 shows how the tailored focal spot shapes are used to machine a feature in a substrate. The laser pulse focal spot shapes, one of which is indicated at 132 are directed onto the substrate 130 starting at pulse 134 and ending at pulse 136, following path 137. The cross sections 144, 146 and 148 of the resulting channel, taken along lines 138, 140 and 142, respectively, correspond to the cumulative laser radiation dose along lines 138, 140 and 142, respectively. Note that all cross sections 144, 146 and 148 are acceptable, meaning that the resulting channel will have a square-sided, flat-bottomed cross section through its entire length, a desired result.

Figure 9:
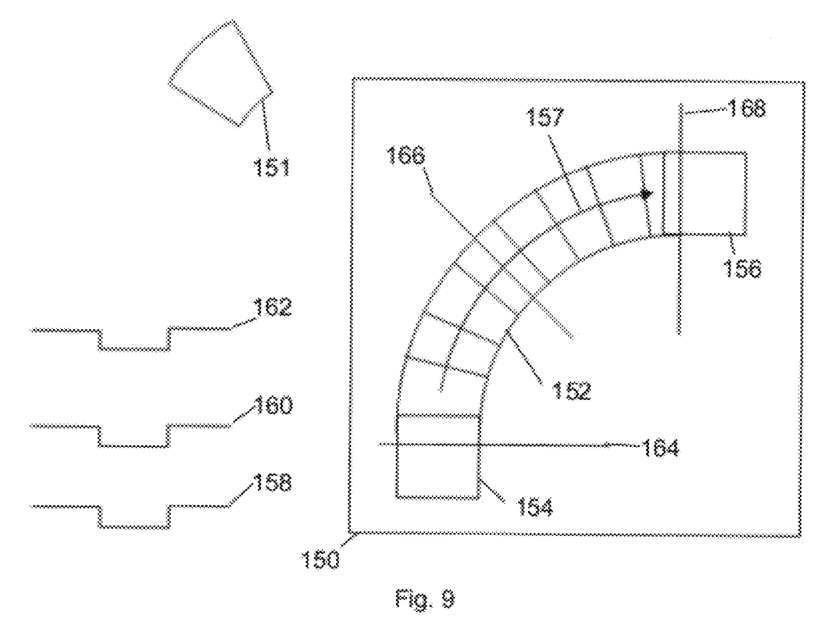
FIG. 9 is a diagram of a curved feature laser machined by an embodiment of the instant invention.

FIG. 9 shows results from another embodiment of the instant invention. In FIG. 9, a substrate 150 is laser machined with a laser pulse focal spot shape 151 that has edges that follow the contour of the desired feature (not shown). This laser focal spot shape 151 will be rotated and translated along path 157 starting at position 154 and ending at 156. The laser pulse focal spots, one of which is indicated 152 will be translated and rotated to fit the desired path 157. The cross sections 158, 160 and 162 of the resulting channel, taken along lines 164, 166 and 168, respectively, correspond to the cumulative laser radiation dose along lines 164, 166 and 168, respectively. Note that all cross sections 158, 160 and 162 are acceptable, meaning that the resulting channel will have a square-sided, flat-bottomed cross section through its entire length, a desired result.

It will be apparent to those of ordinary skill in the art that many changes may be made to the details of the above-described embodiments of this invention without departing from the underlying principles thereof. The scope of the present invention should, therefore, be determined only by the following claims.

I claim:

1. An improved method for machining a feature in a workpiece with a laser machining system, said laser machining system including a laser operative to emit laser pulses, said laser pulses having laser pulse parameters and laser focal spots, each of said focal spots having focal spot parameters comprising spot shape and energy distribution, and said feature extending within the workpiece along a curved path, the improvement comprising:

directing said laser pulses to impinge said workpiece at a plurality of overlapping laser focal spot positions along said curved path, wherein at least one of said laser focal spot parameters for each of said directed laser pulses is selected such that a cumulative laser radiation dose at one of the plurality of overlapping laser spot focal positions along the curved path is consistent with a cumulative laser radiation dose at another one of the plurality of overlapping laser spot focal positions along the curved path, thereby machining said feature in said workpiece.

2. The method of claim 1 further comprising forming a laser pulse having said selected laser focal spot shape with a deformable mirror.

3. The method of claim 1 wherein a width of said feature at one location along said curved path is consistent with a width of said feature at another location along said curved path.

4. The method of claim 1 where said laser pulse parameters comprise wavelength, pulse duration, pulse shape, pulse energy, and pulse repetition rate.

5. The method of claim 1 wherein a depth of said feature at one location along said curved path is consistent with a depth of said feature at another location along said curved path.

6. The method of claim 1 wherein said feature is a channel, wherein a depth of the channel is less than a thickness of the workpiece.

7. An improved laser machining system for machining a feature in a workpiece, said feature extending in the workpiece along a curved path and said laser machining system including a controller, a motion control subsystem operative to move said workpiece and a laser operative to emit laser pulses on a laser beam axis, the improvements comprising:

a beam shaping device arranged at said laser beam axis and operatively connected to said controller so that said laser focal spot is shaped as directed by said controller; and a pulse steering device operatively connected to said controller so that said shaped focal spot is directed to said workpiece at a plurality of overlapping laser focal spot positions such that a cumulative laser radiation dose at one of the plurality of overlapping laser spot focal positions along the curved path is consistent with a cumulative laser radiation dose at another one of the plurality of overlapping laser spot focal positions along the curved path.

8. The system of claim 7, wherein said beam shaping device is a deformable mirror.

* * * * *